No. 866,528. PATENTED SEPT. 17, 1907.
F. J. SMITH.
PORTABLE ELEVATOR AND WAGON DUMP.
APPLICATION FILED JAN. 2, 1907.
2 SHEETS—SHEET 1.
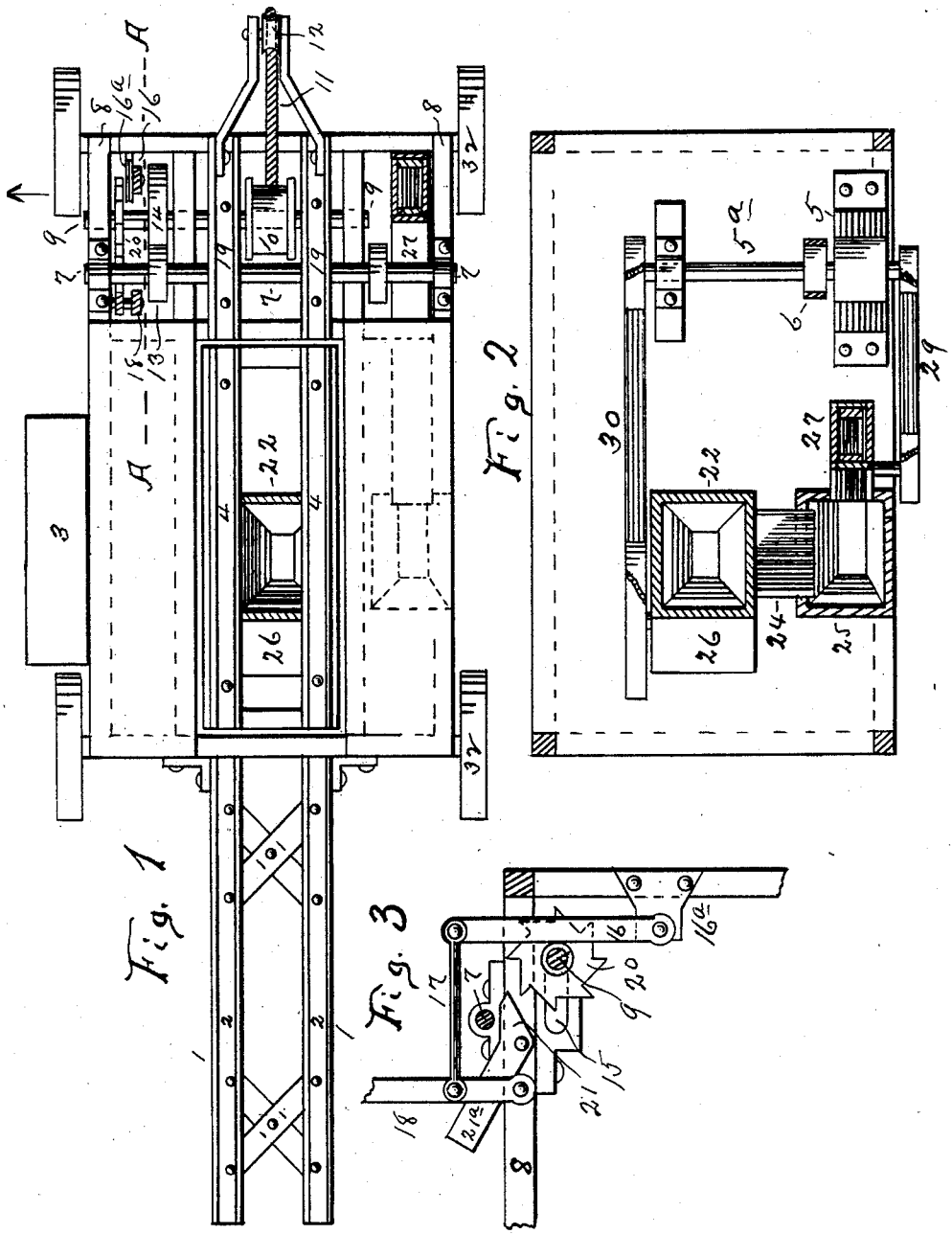

No. 866,528. PATENTED SEPT. 17, 1907.
F. J. SMITH.
PORTABLE ELEVATOR AND WAGON DUMP.
APPLICATION FILED JAN. 2, 1907.
2 SHEETS—SHEET 2.
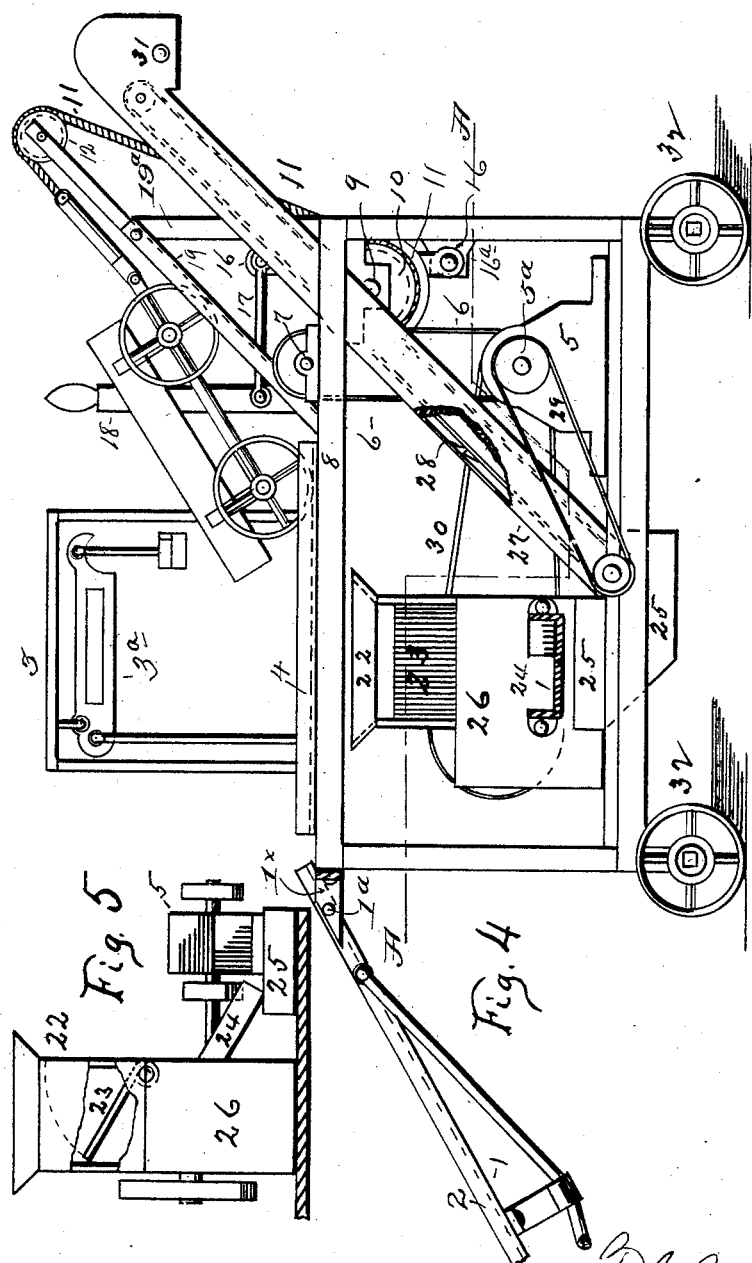

UNITED STATES PATENT OFFICE.

FELIX J. SMITH, OF LINDSAY, OHIO.

PORTABLE ELEVATOR AND WAGON-DUMP.

No. 866,528.  Specification of Letters Patent.  Patented Sept. 17, 1907.

Application filed January 2, 1907. Serial No. 350,474.

*To all whom it may concern:*

Be it known that I, FELIX J. SMITH, a citizen of the United States, and a resident of Lindsay, county of Sandusky, and State of Ohio, have invented certain new and useful Improvements in Portable Elevators and Wagon-Dumps, of which the following is a specification.

The purpose of my invention is to provide useful means, so that at points distant from any stationary elevator or weighing means, and where cars may be stopped, it shall become practical to receive and ship all such grains and vegetables as corn, wheat, oats, potatoes, and beets.

Referring to my drawings herein: Figure 1 represents a top plan view of my device seen from above the second floor, parts being shown sectioned. Fig. 2 represents a top plan view of the lower floor, the upper parts being cut away on the irregular line A—A of Fig. 4. Fig. 3 represents a section view along the line A A of Fig. 1, and looking in the direction of the arrow, the details being enlarged. Fig. 4 represents a side elevation of my device, the approach being partially broken away. Fig. 5 represents a limited end view of my device, looking from the direction of the inclined approach.

Coming to a detailed description of my invention: 1 is an inclined approach which is detachably secured to the elevator frame, by suitable means 1ᵃ passing through a bracket 1ˣ secured to the frame work and preferably is constructed of suitably formed structural iron.

2—2 is a wagon tread or guide, mounted on said approach, and preferably is of flanged or channeled iron; 3 represents the housing of suitable scales, and 3ᵃ, a scale beam thereof, and by which the load to be elevated and transferred to the car, is weighed; 4—4 are wheel guides mounted upon the platform of said scales, and made continuous with the guides 2—2; 5 represents a suitable motor with a main shaft 5ᵃ, the power of which is transmitted by a suitable belt 6, to an upper shaft 7, which is suitably journaled upon stringers 8, and which forms part of the frame work; a horizontally operating shaft 9, carrying a drum 10, is suitably journaled, and friction geared to said shaft 7, which shaft when put in gear, is made to operate said drum and wind a cable 11, which passes over an intervening pulley 12, and thence to the tongue of said wagon. Said friction gear may be of any preferred form so as to transmit the required amount of power, and different kinds thereof are now on public sale, suitable for the purpose. For that purpose I make the respective shafts 7 and 9 to carry fixed wheels 13 and 14, respectively; said shaft 9 at one end is given freedom by means of the slot 15, in which it operates, and at that end it is made to be engaged by a lever 16, which at its lower end is pivoted to a bracket 16ᵃ, secured to the frame work; and oppositely is connected by the rod 17 to an operating lever 18, so that when said lever is operated, said shaft 9 is made to operate and the wagon is drawn; 19—19 are wheel guides set in continuation of the guides 4—4, and the same are suitably supported by supports 19ᵃ, and given a suitable incline so that, as said wagon is drawn from the scales, the forward end is raised sufficient to cause the contents of its box to be dumped. This incline I call the dumping incline. Said shaft 9 is controlled by pawl and ratchet means, for which purpose a suitable ratchet wheel 20 is carried by said shaft, and made to be engaged by a suitable pawl 21 pivoted upon the frame work; said pawl is made to carry an overweighted arm 21ᵃ which is integral therewith and which is made to cause the same to be normally out of engagement with said ratchet wheel, and to become disengaged whenever the lever 18 is operated.

Manifestly, in the construction shown in the drawings, considerable power must be thrown upon said lever in order to operate it, when the load is in the position shown in Fig. 4. But since there are so many forms of friction clutches now on public sale, either one of which would be suitable for the purpose, I do not confine myself to the particular means shown in the drawings, but claim suitable means. Said contents when dumped, is made to be received by a suitable chute or conductor 22, which is provided with a side door or cut-off 23, and which when said door is opened, guides the same to a chute 24, which conducts the same to a hopper receiver 25, with which the foot of a suitable elevator is connectd. It is to be understood that said elevator and hopper are connected in the usual manner, and hence no further details are shown. 26 represents a machine for shelling corn, which when said door 23 is closed, is made to receive said contents, and in turn discharge its product into said chute 24, and thence to said receiver 25. 27 is an elevator, and 28 one of the buckets. Power is transmitted from said motor to said elevator, and to said sheller, in the usual manner. 29 represents a suitable belt operating between said motor and elevator, and 30 a suitable belt between the same and said sheller. At the discharge end of said elevator, the same is suitably adapted to connect with a down spout or a flexible elbow, whereby the matter elevated may be carried as and where desired. 31 represents a suitable stud to which such spout or elbow may be secured. For the purpose of ready movement from place to place, I mount my device upon suitable trucks of which 32 are the wheels.

The operation of my device may now be readily understood. It is such that after the load is weighed, the lever 18 is operated, and the wagon drawn to the required position upon the dumping incline. During this operation, it is intended that by means of the foot or otherwise, the operator shall hold the pawl in operative engagement with said ratchet wheel, so that upon releasing said lever said pawl will control and hold said load. After said load is dumped, then by the operation of said lever, power is again transmitted to said shaft 9, and by a slight operation thereof, said pawl is set free, permitting said lever to be then suitably operated so that the wagon may be allowed to return to the scales, and from thence to the ground.

What I now claim is:

1. A suitable frame work mounted upon trucks, weighing scales elevated therein and supported by said frame work, a detachable inclined approach thereto, suitable flanged or channeled guides upon said incline, and in line therewith, upon said scales, adapted to engage and guide the wheels of a wagon as said wagon is drawn; a second incline for dumping purposes, and a continuation of said guides thereon; a friction geared operating shaft carrying a drum; a cable 11 wound upon said drum, and which passing over an intervening pulley, operates to draw said wagon, when said shaft is operated; a coöperating shaft 7 and means for the operation thereof; suitable friction gears coöperating between said first-mentioned shaft and said shaft 7, causing said first-mentioned shaft to operate as said two shafts are brought into coöperative relation, and said shaft 7 is operated; means for bringing said shafts into coöperative relation and means for controlling the operation of said first-mentioned shaft, comprising: pawl and ratchet means, said pawl being so adapted that when said shaft is made to operate, said pawl becomes automatically disengaged; suitable chutes and guiding spouts made to receive the contents of such wagon, and conduct the same to a receiving hopper with which a suitable elevator is connected; and suitable coöperating means between said elevator, and an engine or other power, which operates to operate said elevator, and said shaft 7, all in combination and substantially as described.

2. A suitable frame work mounted upon trucks; in combination with a detachable inclined portable approach thereto, with guides thereon to receive and guide a moving load; suitable weighing scales supported by said frame work and guides thereon continuous with said inclined guides; a dumping incline with guides thereon continuous with the previously mentioned guides; a suitable engine supported by said trucks, and a shaft operated thereby, together with suitable means coöperating therefor; a second shaft friction geared thereto, and carrying a drum made to operate a suitably guided cable for moving said load, when said shafts are in gear and said first-mentioned shaft is operated; and suitable means for controlling the movement of said second shaft when not in gear, substantially as set forth.

FELIX J. SMITH.

Witnesses:
FRANK J. TUTTLE,
CARL J. HEFFNER.